3,110,743
PARA-n-ALKYL-ISOALKYL-BENZENE SYNTHETIC OILS

Donovan R. Wilgus, Richmond, Calif., assignor to California Research Corporation, San Francisco, Calif., a corporation of Delaware
No Drawing. Filed Feb. 8, 1961, Ser. No. 87,753
3 Claims. (Cl. 260—668)

This invention pertains to certain particular compounds which are useful as lubricating oils; that is, compounds which have qualities necessary for a lubricating oil.

Recently, numerous synthetic oils have been prepared which have become quite important in the field of lubrication. Synthetic oils can be tailor made to suit the particular needs of a lubricant. For example, synthetic lubricants, because of their good viscosity index and low pour points are becoming of greater importance as lubricants for equipment such as gas turbo engines, for the lubrication of aircraft, missiles, etc. Operational requirements of advanced supersonic aircraft and missiles demand lubricants that are capable of withstanding high temperature conditions. Although synthetic oils such as the diesters and alkoxysiloxanes have physical properties which are beneficial, these synthetic lubricants are deficient in thermal stability at temperatures of approximately 700° F.

Lubricating oils which are used in jet engines are subjected to operating conditions so severe that few, if any, oils are available which are satisfactory in all particulars. The primary reason for oil failure in jet aircraft engines is the high temperatures of the surfaces with which the lubricating oil comes into contact. Such high temperatures of 550° F. to 700° F. and higher normally induce rapid carbon formation, or coking in the oil and greatly accelerate deterioration of the oil in the presence of air.

Synthetic oils are used not only in the lubrication of wearing surfaces in jet aircraft; such oils can also be used in the hydraulic systems of aircraft to transmit power in the operation of the numerous parts of the aircraft, and at the same time lubricate the parts of the hydraulic system.

The hydraulic power systems of aircraft impose stringent requirements on the hydraulic fluids used. Not only must the hydraulic fluid for aircraft meet stringent functional and use requirements, but in addition, such fluids should be as highly flowable as possible. The viscosity characteristics of the fluid must be such that it may be used over a wide temperature range; that is, the viscosity must be adequately high at high temperature, and low at low temperature, and also have a low rate of change of viscosity with temperature. The viscosity-temperature characteristics of the oil must be such as to permit starting of the engine at temperatures well below −50° F., yet give excellent lubrication at the temperatures as high as 700° F. and higher. In addition, aircraft hydraulic fluids should have low volatility at elevated temperatures to maintain a reasonably low oil consumption rate.

It is a primary object of this invention to set forth synthetic lubricating compositions which are useful as base oils in the lubrication of jet aircraft, missiles, etc. at high temperatures.

Thus, in accordance with this invention, it has been discovered that certain para-n-alkyl isoalkyl benzenes are synthetic oils having outstanding characteristics.

The para-n-alkyl "isoalkyl" benzene synthetic oils of this invention are para-n-nonyl "isooctyl" benzene, para-n-nonyl "isodecyl" benzene, and para-n-dodecyl "isodecyl" benzene in which all of the attachments of the n-alkyl radicals and "isoalkyl" radicals to the benzene ring are through primary carbon atoms only.

The synthetic oils described herein are useful not only for lubrication of aircraft, missiles, etc., at high temperatures and for use as hydraulic fluids, they are also useful as lubricants for machinery, such as gas turbine engines, as base oils for greases, etc.

Example I hereinbelow illustrates the preparation of these new n-alkyl isoalkyl benzenes.

The "isoradicals" noted herein are branched chain radicals derived from carboxylic acids prepared by the Oxo process. In this process, carbon monoxide and hydrogen are reacted with an olefin, using a cobalt catalyst. The acids obtained by this process are primarily monomethyl and dimethyl substituted monocarboxylic acid.

EXAMPLE I.—PARA-n-NONYL "ISOOCTYL" BENZENE

A mixture of 210 grams (1.33 mols) of pelargonic acid and 42.8 cc. (0.49 mol) of phosphorous trichloride was heated with intermittent agitation at 40–50° C., for a period of two hours, after which the acid chloride was decanted from the phosphorous acid. The resulting acid chloride was slowly added to a mixture of 180 grams (1.35 mols) of granular anhydrous aluminum chloride in 266 cc. (3.0 mols) of benzene during a period of 30 minutes at a temperature range of 55–60° C.

The mixture was then heated for one hour at 75–80° C. after which the mixture was cooled to room temperature, then poured onto a crushed ice-water sludge to which 50 cc. of concentrated hydrochloric acid had been added. The resulting mixture was transferred to a separatory funnel to drain off the acid-water layer. The remaining organic layer was caustic washed and water washed until the final wash water was neutral to pH paper. The resulting solution was filtered through Celite, followed by evaporation of the solvent. The crude pelargono-phenone, in the amount of 250 grams (1.15 mols), 300 cc. of triethylene glycol and 141 grams (2.4 mols) of 85% hydrazine hydrate was heated at 100° C. for one hour, followed by cooling after which there was added 18 grams (0.32 mol) of potassium hydroxide pellets.

The whole mixture was heated at 200–210° C. for 12 hours, cooled, and transferred to a 2-liter separatory funnel. Approximately 100 cc. of benzene was added. The caustic layer was drained therefrom, and the hydrocarbon layer was washed twice with water, then with dilute hydrochloric acid, and with water until the final wash water was neutral to pH paper. The solution was filtered through Celite, the solvent was evaporated therefrom, and the remaining reaction mixture was distilled to recover the n-nonyl benzene in the boiling range of 95–111° C. at an absolute pressure of 0.75 mm.

Iso-octanoic acid chloride was prepared in a manner similar to that described hereinabove for the preparation of the pelargonic acid chloride, using 134 grams (0.930 mol) iso-octanoic acid, and 29.7 cc. (0.34 mol) of phosphorous trichloride.

The resulting iso-octanoic acid chloride was added to a mixture consisting of 181 grams (0.888 mol) of n-nonyl benzene and 119 grams (0.89 mol) of granular anhydrous aluminum chloride. This reaction mixture was treated in the same manner as described hereinabove by pouring the mixture onto an acidified crushed ice-water sludge, recovering 278 grams of crude ketone.

A mixture consisting of 278 grams (0.84 mol) of the crude ketone, 300 cc. of triethylene glycol, 99 grams (1.68 mols) of 85% hydrazine hydrate and 20 grams (0.36 mol) of potassium hydroxide pellets was heated at 200–210° C. for 24 hours. The product was acid washed and water washed until neutral to pH paper, and distilled. 134 grams of para-n-nonyl "iso-octyl" benzene was recovered in the boiling range of 160–169° C. at an overhead pressure of 0.5 mm.

Tables I and II hereinbelow present data showing the physical characteristics of the synthetic oils of this invention. In the data of Table II, the "Thermal Stability" was determined by sealing 10 grams of the fluid in a stainless steel capsule with an inert atmosphere for a period of 6 hours at 700° F.

*Table I*

|  | Boiling Range, °C./mm. | Refractive Index, $N_D^{20}$ |
|---|---|---|
| (1) p-n-Nonyl "Isooctyl" benzene | 166–184/0.5 | 1.4852 |
| (2) p-n-Nonyl "Isodecyl" benzene | 171–187/0.4 | 1.4850 |
| (3) p-n-Dodecyl "Isodecyl" benzene | 189–208/0.3 | 1.4854 |

*Table II*

| Oil | V.I. | Pour Point, °F. | Thermal Stability | |
|---|---|---|---|---|
|  |  |  | Percent Vis. Loss at 100° F. | Gas Evolution, ml./g. |
| (1) p-n-nonyl "isooctyl" benzene | 136 | <−107 | 27 | 2.7 |
| (2) p-n-nonyl "isodecyl" | 125 | <−80 | 39 | 5.0 |
| (3) p-n-dodecyl "isodecyl" bezenne | 146 | −36 | 58 | 9.9 |

The synthetic lubricating oils described herein may contain various oxidation inhibitors, corrosion inhibitors, thickening agents of various types, etc.

I claim:
1. The compound, p-n-nonyl "isooctyl" benzene.
2. The compound, p-n-nonyl "isodecyl" benzene.
3. The compound, p-n-dodecyl "isodecyl" benzene.

References Cited in the file of this patent

UNITED STATES PATENTS

| 2,390,835 | Hennion et al. | Dec. 11, 1945 |
| 2,810,769 | Sanford et al. | Oct. 22, 1957 |